3,287,303
EPOXY RESIN-AMINE COMPLEX ADHESIVE COMPOSITION AND PROCESS OF PREPARING SAME
Herman B. Wagner, Perkasie, Pa., assignor to Tile Council of America, Inc., New York, N.Y., a corporation of New York
No Drawing. Filed June 24, 1964, Ser. No. 377,530
14 Claims. 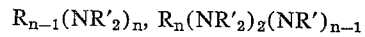

This application is a continuation-in-part of my earlier filed application Serial No. 65,278, filed October 27, 1960 now abandoned.

The present invention relates to adhesive compositions which are made functional by the addition of a liquid thereto. More particularly the present invention relates to dry compositions comprising epoxide resins, and amine complex hardener salts which are caused to be functional by the addition of a liquid thereto.

The usefulness of epoxy resin adhesives is univerally recognized. The applications in which these resins are used are literally too numerous to mention. Despite the universal acceptance of epoxide resin polymers as bonding agents and the like it is recognized in conventional practice with these polymers that they present numerous problems of handling which are accepted as necessary to the use thereof, which use is made because of the extraordinary qualities of the product in spite of the awkwardness with which they are used.

Epoxy resin polymers can be formed by bringing together an epoxide resin monomer or prepolymer and a liquid amine hardener. The two basic components are mixed intimately and the cross-linking and polymerization that take place result in a product having extremely high bond strength and chemical resistance. The amine hardener is usually a diamine or a polyfunctional amine. These amines have been recognized to be especially well suited to cross-linking with such polymers because of their very high reactivity even at room temperature.

In addition to the disadvantage of multiple packaging in order to insure against premature contact of the epoxy resin with the amine hardener there are other objections connected with epoxide amine systems in that some free diamines and polyamines are volatile substances with irritating and allergenic actions. The two essential components must be mixed in reasonably accurate proportions in order to obtain maximum cross-linking of the polymer. The homogeneous mixing of the liquid-liquid systems of amine and epoxide resin polymer is sometimes difficult to achieve, since the reaction is rapid and any pockets of reaction product tend to block out other portions of the as yet unreacted ingredients.

The present invention avoids these disadvantages and provides a unitary dry adhesive composition which may be made functional at room temperature and ready for use by the addition of water which serves the dual function of activating the polymerization reaction and giving fluidity to the dry pulverulent composition.

The present invention comprises bringing together in dry pulverulent form the following substances:

An epoxy-type monomer or prepolymer, a complex amine salt produced by the reaction of a metal salt and a di- or poly-functional amine. At the time of use water is added to initiate the polymerization, which will progress at room temperature.

The hardeners of the present invention are produced by reaction of polyamines with metallic salts capable of yielding cations having the ability to form stable complexes with amino groups. The polyamines suitable for use in preparing the hardeners disclosed herein are aliphatic polyamines containing two or more amino nitrogens preferably attached to aliphatic carbon atoms, and more particularly amines of the formulae:

$$R_{n-1}(NR'_2)_n, \ R_n(NR'_2)_2(NR')_{n-1}$$

where R is an alkyl, cycloalkyl or alkylene hydrocarbon radical and R' is an alkyl, cycloalkyl or alkylene hydrocarbon group or hydrogen, and $n$ is an integer from 2 to 10 or even higher. Preferably the polyamines contains 2 or more primary or secondary amino nitrogens, have not more than about 30 carbon atoms in the aliphatic group connected to the amino nitrogens, and not more than a total of about 50 carbon atoms. Especially suitable are polyamines containing 2 or more primary amino nitrogens connected to an aliphatic hydrocarbon group containing up to 30 carbon atoms.

Examples of polyamines that may be used include ethylene diamine, propylene diamine, diethylene triamine, dipropylene triamine, triethylene tetramine, tripropylene tetramine, tetraethylene pentamine, tetrapropylene pentamine, and mixtures of the foregoing. Also may be mentioned higher alkyl polyamines satisfying the above formulae, such as alkyl polyamines in which the alkyl group is butyl, hexyl, octyl and so forth.

The metal salts suitable for use in preparing the hardeners of the present invention are those capable of releasing cations which form stable complexes with amines. Typical of these are the strong and weak mineral and organic acid salts of calcium, zinc, copper, silver, and nickel. Of these, exceptionally good results are achieved with calcium and zinc salts and these are preferred. The anions of the salts are not critical. For example, the halides, nitrates, sulfates, phosphates, acetates, and other weak and strong mineral and organic acid salts of these metals may be employed, as will be readily apparent to those skilled in the art.

In preparing the hardeners of the present invention, the metal salts capable of yielding cations which react with amino groups to form stable complexes are added, preferably in finely divided form, to the polyamines described hereinabove, and the mixture is agitated. The time of reaction and temperature will depend upon the particular polyamine and metal salts used. Completion of the reaction is indicated by disappearance of the polyamine and the appearance of powder in those cases where the reaction is conducted below the melting point of the reaction product. When the reaction is conducted above the melting point of the reaction product, the reaction is continued until a homogeneous mixture appears, at which time the reaction product may be cooled to below its melting point to give a solid material which may be pulverized to a powder. In those instances where the complex aminate reaction product is a liquid, this may be suitably absorbed on a carrier, as will be explained more fully hereinbelow.

Illustrative of the amine complex compounds described herein is that produced when calcium chloride is reacted with ethylene diamine. This reaction may be illustrated as follows:

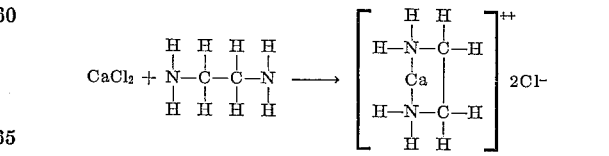

More realistically, the reaction product has probably a continuous crystalline structure represented as:

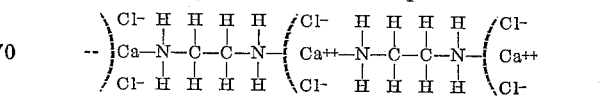

and extending, of course, in three dimensions. As can be seen, the reaction products according to the teaching herein may be described as stable amine complexes of metal salts and polyamines. The structure of other stable amine complexes will readily suggest themselves to one skilled in the art from the foregoing description.

The hardeners prepared according to the present invention may be mixed with epoxy-type polymers or monomers of the liquid or solid type.

The resinous epoxies suitable for use in the present invention comprise those compounds having at least two epoxy groups, i.e., at least two

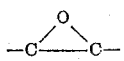

groups. The polyepoxides may be saturated or unsaturated, cycloaliphatic, heterocyclic, or preferably aliphatic, and may be substituted if desired with substituents such as chlorine atoms, hydroxyl groups, ether radicals, and the like. They may also be monomeric or polymeric.

Examples of the polyepoxides include, among others, epoxidized glycerol dioleate, 1,4-bis(2,3-epoxypropoxy) benzene, 1,3-bis(2,3-epoxypropoxy) benzene, 4,4'-bis(2-3-epoxypropoxy) diphenyl ether, 1,8-bis(2,3-epoxypropoxy)-octane, 1,4 - bis(2,3-epoxypropoxy)-cyclohexane, 4,4'-bis(2-hydroxy-3,4'-epoxybutoxy) - diphenyldimethylmethane, 1,3-bis(4,5-epoxypentoxy) - 5 - chlorobenzene, 1,4-bis(3,4 - epoxybutoxy)-2-chlorocyclohexane, 1,3-bis-(2-hydroxy-3,4-epoxybutoxy) benzene, 1,4-bis and (2-hydroxy-4,5-epoxypentoxy) benzene.

Among the preferred epoxides are the epoxy polyethers of polyhydric phenols obtained by reacting a polyhydric phenol with a halogen containing epoxide or dihalohydrin in an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (Bis-phenol A), 2,2-bis(4-hydroxyphenyl) butane, 4,4'-dihydroxybenzophenone, bis(b-hydroxyphenyl) ethane, 2,2-bis(4-hydroxyphenyl) pentane, and 1,5-dihydroxynaphthalene. The halogen-containing epoxides may be further exemplified by 3-chloro-1, 2-epoxybutane, 3-bromo-1,2-epoxyhexane, 3-chloro-1,2-epoxyoctane, and the like.

The monomer products produced by this method from dihydric phenols and epichlorohydrin may be represented by the general formula:

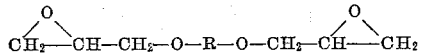

wherein R represents a divalent hydrocarbon radical of the dihydric phenol. The polymeric products will generally not be a single simple molecule but will be a complex mixture of glycidyl polyethers of the general formula:

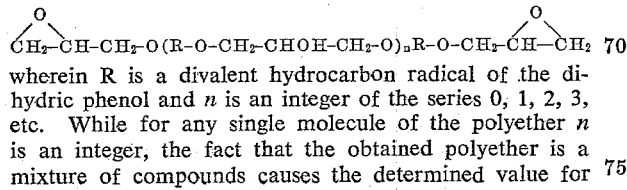

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substance, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The epoxy resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins," "Gen Epoxy," "DER Resins," "ERL Resins," "Epi-Rez" and the trifunctional epoxy compounds sold under the trademark "Epiphen." An example of the trifunctional type of compounds is "Epiphen" ER–823, which has the following formula:

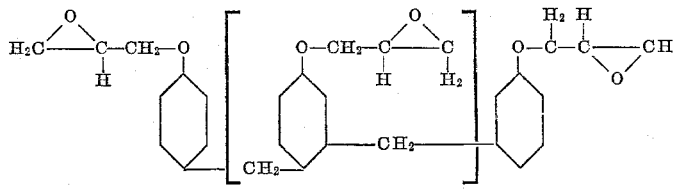

When the epoxy resin monomers or prepolymers are liquid, these are preferably absorbed or otherwise carried on inert materials or fillers to make the all powder compositions of the present invention. As an example of such inert materials may be mentioned silica aerogel, blanc fixe, talc, pyrophyllite, various kaolin clays, diatomaceous earth, and other like inert materials. The carriers for the epoxy resins are preferably in a fine state of subdivision, and have high surface areas. Good results are also achieved when aggregates, such as sand, are used alone or in combination with such fillers.

Silica aerogel and finely divided sand are particularly suitable as a combination carrier and aggregate for the components of the present invention. These materials in combination insure the availability of a great surface for contact of the epoxy resins and the amine hardeners. The sand moderates the speed of reaction by taking up a considerable amount of the heat produced by the initial solution of some of the components and the heat produced during the cross-linking of the amine and epoxy resin. A balance between rate of curing and ultimate shrinkage may be obtained by varying the amounts of filler in the form of aggregate and carrier which are included in the dry compositions.

The silica aerogel may have a particle size in the range of about 0.1 to about 20 mircons, preferably between about 0.5 to about 3.0 microns, and a specific surface area of about 10 to about 800 square meters per gram, preferably between about 85 and 600 square meters per gram. The sand preferably has a particle size varying from about 10 to 300 mesh, Tyler Standard.

Liquid epoxide resins and the hardeners described herein through intermixture with and absorption on inert materials and aggregates are made substantially dry and can be contacted with each other without initiating any appreciable degree of polymerization. The mixtures are relatively uniform and therefore may be prepared in such manner that any portion may be removed from the whole and still retain substantially the proportion of epoxy resin and amine hardener which were originally determined to be most suitable for the particular ingredients used in making up the dry composition.

In forming the epoxy resin bonding compositions, enough of the hardeners disclosed herein are added to the epoxy resin composition to insure that upon activation, good hardening is achieved. Preferably the hardeners and epoxy-resin prepolymers are present in the dry compositions in stoichiometric proportions. Depending on the nature of the adhesive composition desired, however, greater or lesser amounts of the hardener may, of course, be used.

When water is added to the compositions to make them functional, i.e., to initiate and cause polymerization, it is believed that a hydrate or other similar complex of the metal salt portion of the aminate hardener is formed, thereby displacing the free amine, which is then available for reaction and hardening of the epoxide resin. Although not wishing to be restricted to the description set forth above, it is believed to be the probable description of the chemical process involved.

In the absence of moisture the unitary compositions disclosed are extremely stable. Sensitivity to water in the form of high humidity or other vapor lies between portland cement and calcium chloride. The compositions therefore may be stored or transported in plastic-lined paper bags and the like without other special precautions being necessary.

A distinct advantage of the instant invention resides in the fact that a one-part epoxy resin system is activated for curing at room temperature by the addition of the common, non-toxic fluid, water.

In activating the inert hardener enough water is added to the epoxy resin composition to insure that complete activation of the stable amine complex is realized and good hardening is achieved. The amount of water added is at least about that stoichiometrically required for formation of the metal salt hydrate.

The preferred one-part, all powder system is made into a workable mass as well as activated with water. A range of 5 to 30 percent and preferably 10 to 25 percent water based upon the weight of the dry powder system offers freedom to obtain desirable working properties for application, e.g., trowellability, and overcomes the necessity of precise measurements. Within the above indicated range, the amount of water added is at least about that stoichiometrically required for formation of the metal salt hydrate and additionally to obtain the desired workability.

Epoxy resins containing the hardeners of the present invention are particularly adapted for use as trowellable grouts or mortars to set ceramic tiles, and to fill the joints between the tiles. When used for this purpose, the epoxy resin compositions form a hard, adherent, chemically resistant bond. These compositions also have the advantage that they cure at room temperature, thereby rendering their use for this purpose especially advantageous.

The epoxy resin compositions using the hardeners of the present invention bond exceedingly well to ceramic tile edges and to the backs of ceramic tile. Additionally, these compositions are flexible, and resistant to moderate temperature change. Also, such compositions are resistant to acid and alkali attack.

If desired, the epoxy resins can be compounded with other resins, such as polystyrene resins, polyester resins, and so forth, to increase the flexibility of the hardened compositions.

Specific examples embodying the teachings set forth above are here given by way of exemplification and not restriction.

*Example 1*

An amine complex "A" of calcium chloride and ethylene diamine was prepared by mixing 55.5 parts by weight of anhydrous, finely powdered calcium chloride with 30.0 parts by weight of diamine at room temeprature. The mixture was agitated to form an intimate dispersion. Agitation was continued until the liquid phase disappeared and a dry powder which was somewhat caked appeared. The temperature of the mixture at the commencement of agitation increased rapidly, indicating that reaction was occurring, and fell gradually as the powder formed and the liquid phase disappeared. The molar ratio of $CaCl_2$ to ethylene diamine was 1:1, so that the reaction product corresponded to the empirical formula $Ca(NH_2)_2C_2H_4Cl_2$.

15.4 grams of the product thus obtained were dispersed in 100 grams of liquid epoxy resin of the epichlorohydrin-bisphenol of acetone type, having a viscosity of about 130 poises (25° C.), an epoxide equivalent of about 200, and a melting point in the range of about 8–12° C. The structural formula of the epoxide resin may be represented as:

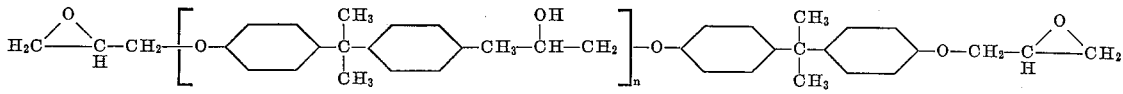

To this dispersion, there were then added 9.7 grams of water, this weight being that stoichiometrically required for formation of the $CaCl_2 \cdot H_2O$ hydrate. During mixing the odor of ethylene diamine was evident, and after 24 hours the mass had solidified.

*Example 2*

100 weight parts of the liquid epoxy resin described in Example 1 were mixed with 233 parts by weight of fine sand and 40 parts by weight of silicon dioxide aerogel. The silica dioxide aerogel had a particle size in the range of 0.5 to 3.0 microns and a specific surface area of 200 square meters per gram. The function of the addition of the sand, which had a particle size between about 16 and 300 mesh, and the silica aerogel is that of converting the liquid polymers into the form of a free-flowing powder.

The following powder mixture is prepared:

15 weight parts of the complex amine "A" in Example 1.
373 weight parts of the resin powder prepared above.

The resulting mixture was a free-flowing powder, remarkably stable upon long term storage, even through the epoxy resin and hardener were in intimate contact with one another.

When water is added to this powder a fluid, coherent mix is obtained. This mix is spread onto a concrete floor surface at a thickness of approximately 3/32″ and used as a setting bed (adhesive) for ceramic tile. After a period of 24 hours the material hardens and a strong bond develops to the concrete surface and the underside of the tile.

*Example 3*

A composition similar to that described in Example 1 was prepared, but using 34.5 grams of diethylene triamine in place of the 30.0 grams of ethylene diamine in Example 1. Comparable results were obtained.

*Example 4*

Example 1 was repeated, with the exception that 37.5 grams of tetraethylene pentamine were used in place of the 30.0 grams of ethylene diamine of Example 1. Comparable results were obtained.

Example 5

A composition similar to that described in Example 2 was prepared but using the amine complex of Example 3 produced by reaction of calcium chloride with diethylene triamine.

When 20 percent by weight of water based on the total weight of the dry powder is added to the powder epoxy resin system a fluid, workable mix was obtained. The mix was spread onto a concrete floor surface at a thickness of approximately 3/32" and used as a setting bed (adhesive) for an array of spaced 1" x 1" ceramic tile. After a period of 24 hours the adhesive material hardened and a strong bond developed between the underside of the ceramic tile and the concrete substrate.

Water was added to another batch of dry epoxy resin powder prepared as above and the fluid mix was spread over the face and into the joints of the spaced adhered ceramic tile array, the excess was removed from the face of the tile and the adhesive was allowed to harden. After 24 hours the joint filler material hardened and a strongly adhered, hard surface was obtained.

Example 6

A composition similar to that described in Example 2 was prepared, but using the amine complex of Example 4 produced by the reaction of tetraethylene pentamine and calcium chloride. Comparable results were obtained.

Example 7

A composition similar to that described in Example 1 was prepared, but using zinc chloride to produce the amine complex. Comparable results were obtained.

Example 8

A composition similar to that described in Example 2 was prepared, but using cuprous chloride to form the amine complex. Comparable results were obtained.

Example 9

A composition similar to that described in Example 2 was prepared but using silver nitrate to form the complex amine. Comparable results were achieved.

Due to their greater availability commercially produced polyfunctional amines may be used in this invention with equal success to that obtained using pure amines. Examples of such commercially available amines are those obtained under the trade names "Duomeen O" and "Duomeen S." "Duomeen O" consists essentially of a mixture of N-alkyl trimethylene diamines derived from technical grade oleic acid. The alkyl group content is distributed as follows:

| | Percent |
|---|---|
| C–14 | 2 |
| C–16 | 5 |
| C–18 | 93 |

"Duomeen S" consists essentially of a mixture of N-alkyl trimethylene diamines derived from soya acids. The alkyl group content is distributed approximately as follows:

| | Percent |
|---|---|
| C–16 | 13 |
| C–18 | 87 |

Example 10

An amine complex "B" was prepared by grinding 50.0 parts by weight of anhydrous calcium chloride into 121 parts by weight of N-oleic trimethylene diamine which was purchased under the trade name "Duomeen O." The resulting admixture was heated at 120° C. with agitation for 16 hours, at which time the mixture was homogeneous. The mixture was then cooled to room temperature to form a solid mass which was ground to a fine powder.

100 grams of the epoxy resin of Example 1 were mixed with 100 grams of fine sand and 10 grams of silicon dioxide aerogel. The sand and silica aerogel had the properties described hereinabove in Example 1.

The following powder mixture was prepared:

65 grams of the amine complex "B"
210 grams of the resin powder prepared above.

This composition was a free-flowing powder, which was remarkably stable upon long term storage. When 60 grams of water were added to this powder, a fluid coherent mix was obtained. The resulting pliable plastic mass was used to bond ceramic tiles in both edge to edge and back to back relationship. Upon standing, the plastic mass hardened to give a strong bond.

A powder mixture of the same composition described above was mixed with water and then used as a setting bed for ceramic tile using the procedure of Example 2. After 24 hours at room temperature the setting material hardened and the ceramic tile was well adhered to the substrate.

Example 11

The procedure of Example 1 was followed but with substitution of a solid epoxy polymer of the epichlorohydrin-bisphenol of acetone type. The epoxy polymer had a melting point of about 42° C. and an epoxide equivalent weight of 500.

15.4 grams of the amine complex "A" produced in Example 1 were mixed with 100 grams of the solid epoxide resin to give a free-flowing powder which was remarkably stable upon long term storage. When 9.7 grams of water was added to this powder, a pliable plastic mass is obtained which formed a hard strong bond to concrete, ceramic tile, gypsum wallboard and plywood upon hardening.

The invention in its broader aspects is not limited to the specific steps, methods, compositions and improvements shown and described herein, but departures may be made within the scope of the accompanying claims without departing from the principles of the invention and without sacrificing its chief advantages.

What is claimed:

1. An epoxy resin bonding composition adapted to be hardened at room temperature which comprises:

(a) an epoxy resin in admixture with a stable polyamine metal-salt complex epoxy resin hardener, said epoxy resin having at least two functional epoxy groups capable of entering into a cross-linking reaction with amino nitrogen, a solid finely divided, inert carrier; said stable polyamine-metal salt complex epoxy resin hardener being the reaction product of an aliphatic polyamine containing at least two amino nitrogens attached to aliphatic carbon atoms and a metal salt of an acid, said metal salt being a member selected from the group consisting of halides, nitrates, sulfates and phosphates, the metal cation of which is capable of forming a stable complex with the amino groups of the polyamine; and is selected from the group consisting of calcium, zinc, copper, silver and nickel; said epoxy resin and said epoxy resin hardener being mixed in substantially stoichiometric proportions; and (b) between about 5 and 30 percent by weight of water based on the weight of the epoxy resin and hardener admixture.

2. A method for preparing an epoxy resin bonding composition adapted to be hardened at room temperature which comprises:

(a) forming a stable polyamine-metal salt complex epoxy resin hardener by reacting an aliphatic polyamine containing at least two amino nitrogens attached to aliphatic carbon atoms and a metal salt of an acid, said metal salt being a member selected from the group consisting of halides, nitrates, sulfates and phosphates, the metal cation of which salt is capable of forming a stable metal cation amine complex with the amino groups of the polyamine and is selected from the group consisting of calcium, zinc, copper, silver and nickel;

(b) intimately mixing said stable epoxy resin polyamine-metal salt complex hardener with about a stoichiometric proportion of an epoxy resin having at least two functional

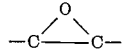

epoxy groups capable of entering into a cross-linking reaction with the amino nitrogen, thereby preparing a one-part, stable, water-activatable epoxy resin composition; and (c) adding about 5 to 30 percent by weight of water based on the weight of said amine hardener and said epoxy resin admixture.

3. An epoxy resin bonding composition adapted to be hardened at room temperature which comprises:

(a) an epoxy resin having at least two functional

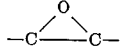

groups capable of entering into a cross-linking reaction with amino nitrogen groups of a polyamine epoxy resin hardener in admixture with;

(b) an epoxy resin hardener said hardener being a stable amine-metal salt complex which is a reaction product of a polyamine epoxy resin hardener and a metal salt of an acid, said metal salt being a member selected from the group consisting of halides, nitrates, sulfates and phosphates, the metal cation of the salt being a member selected from the group consisting of calcium, zinc, copper, silver and nickel, and being capable of forming a stable complex with the amino groups of the polyamine; and (c) an epoxy resin hardener activator, said activator consisting essentially of at least 5 percent by weight of water based on the weight of said epoxy resin and amine hardener composition and in sufficient amount to activate said hardener and carry out said cross-linking reaction.

4. An epoxy resin bonding composition adapted to be hardened at room temperature which comprises:

(a) a liquid epoxy resin having at least two functional

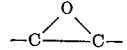

groups and capable of entering into a cross-linking reaction with amino nitrogen groups of a polyamine epoxy resin hardener, the epoxy resin being adsorbed on a solid, finely divided inert carrier in admixture with;

(b) an epoxy resin hardener said hardener being a stable amine-metal salt complex which is a reaction product of a polyamine epoxy resin hardener and a metal salt of an acid, said metal salt being a member selected from the group consisting of halides, nitrates, sulfates and phosphates, the metal cation of the salt being a member selected from the group consisting of calcium, zinc, copper, silver and nickel, and being capable of forming a stable cation amine complex with the amino groups of the polyamine; and (c) at least 5 percent by weight of water based on the weight of said epoxy resin and amine hardener composition and in sufficient amount to activate said hardener and carry out said cross-linking reaction.

5. An epoxy resin bonding composition adapted to be hardened at room temperature which comprises:

(a) a liquid epoxy resin having at least two functional

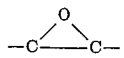

groups and capable of entering into a cross-linking reaction with amino nitrogen groups of a polyamine epoxy resin hardener, the epoxy resin being adsorbed on a solid, finely divided inert carrier in admixture with;

(b) a stable amine-metal salt complex epoxy resin hardener, said hardener being the reaction product of a polyamine and a metal salt of acetic acid, the metal cation of the salt being a member selected from the group consisting of calcium, zinc, copper, silver and nickel; and (c) an epoxy resin hardener activator, said activator consisting essentially of at least 5 percent by weight of water based on the weight of the epoxy resin and hardener admixture.

6. An epoxy resin bonding composition adapted to be hardened at room temperature which comprises in admixture:

(a) a liquid epoxy resin having at least two functional

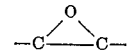

groups, the liquid epoxy resin being adsorbed on a finely divided solid inert carrier; a stable amine-metal salt complex epoxy resin hardener which is the reaction product of a polyamine epoxy resin hardener and a calcium halide; and (b) an amine-metal salt complex epoxy resin hardener activator, said activator consisting essentially of 5 to 30% by weight of water based on the weight of the epoxy resin and hardener admixture.

7. The composition of claim 6 wherein the calcium halide is calcium chloride.

8. An epoxy resin bonding composition adapted to be hardened at room temperature which comprises: an epoxy resin-stable amine-metal salt complex epoxy resin hardener admixture;

(a) said epoxy resin having at least two

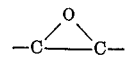

groups;

(b) said stable epoxy resin hardener being the reaction product of a polyamine and a metal salt of an acid, said metal salt being a member selected from the group consisting of halides, nitrates, sulfates and phosphates, the polyamine being a member selected from the group consisting of compounds having the formula $R_{n-1}(NR^1_2)_n$ and $R_n(NR^1_2)_n$ where R is an aliphatic hydrocarbon radical, $R^1$ is a member selected from the group consisting of aliphatic hydrocarbon groups, aromatic hydrocarbon groups, and hydrogen and $n$ is an integer of at least 2, the metal salt containing a cation which is a member selected from the group consisting of calcium, zinc, copper, silver and nickel, said epoxy resin hardener and said amine metal salt complex being mixed in about stoichiometric proportions; and (c) an activator for the stable amine-metal salt complex epoxy resin hardener, said activator consisting essentially of at least 5 percent by weight of water based on the weight of said epoxy resin and amine hardener composition and the amount of water in the admixture being about the amount stoichiometrically required for formation of the hydrate of the metal salt.

9. Method of preparing an epoxy resin bonding composition adapted to be hardened at room temperature which comprises:

(a) forming a stable amine-metal salt complex epoxy resin hardener by reacting a polyamine and a metal salt of an acid, said metal salt being a member selected from the group consisting of halides, nitrates, sulfates and phosphates, the metal cation of the salt being a member selected from the group consisting of calcium, zinc, copper, silver and nickel, and being capable of forming a stable metal cation-amine complex with the amino groups of the polyamine;

(b) mixing said stable amine-metal salt complex with a liquid epoxy resin having at least two functional

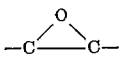

groups capable of entering into a cross-linking reaction with amino nitrogen groups of a polyamine epoxy resin hardener, said liquid epoxy resin being adsorbed on a solid, finely divided inert carrier; and (c) admixing with the mixture of said epoxy resin-stable amine-metal salt complex epoxy resin hardener an activator for said epoxy resin hardener, said activator consisting essentially of at least 5% by weight of water based on the weight of the epoxy resin and hardener admixture.

10. The method of claim 9 wherein the stable amine-metal salt complex is a liquid and is adsorbed on a finely divided inert carrier.

11. The method of claim 9 wherein the polyamine is a member selected from the group consisting of compounds having the formula $R_{n-1}(NR^1{}_2)_n$, where R is an aliphatic hydrocarbon radical, and $R^1$ is a member selected from the group consisting of aliphatic hydrocarbon groups, aromatic hydrocarbon groups, and hydrogen, and $n$ is an integer of at least 2.

12. A method of preparing an epoxy resin bonding composition adapted to be hardened at room temperature which comprises admixing:

(a) an epoxy resin having at least two functional

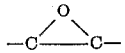

groups capable of entering into a cross-linking reaction with amino nitrogen groups of a polyamine epoxy resin hardener;

(b) a stable amine-metal salt complex which is a reaction product of a polyamine and calcium chloride; and (c) an activator for said stable amine-metal salt complex where said activator consists essentially of at least 5% by weight of water based on the weight of the epoxy resin and hardener admixture.

13. The method of setting tile which comprises:

(a) preparing a mortar by adding water to a composition comprising an epoxy resin having at least two functional

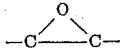

epoxy groups and capable of entering into a cross-linking reaction with amino nitrogen groups of a polyamine hardener, and a stable polyamine-metal salt complex epoxy resin hardener, said hardener being the reaction product of a polyamine and a metal salt of an acid, said metal salt being a member selected from the group consisting of halides, nitrates, sulfates and phosphates, the metal cation of the salt being a member selected from the group consisting of calcium, zinc, copper, silver and nickel; and said water comprising at least 5 percent by weight of water based on the weight of said epoxy resin and amine hardener composition, (b) covering the substrate with a bed of the mortar;

(c) setting tile in the bed; and (d) allowing the mortar to cure.

14. The method of grouting tile which comprises:

(a) preparing a mortar by adding water to a composition comprising an epoxy resin having at least two functional

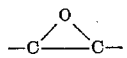

groups and capable of entering into a cross-linking reaction with amino nitrogen groups of a polyamine hardener, and a stable polyamine-metal salt complex epoxy resin hardener, said hardener being the reaction product of a polyamine and a metal salt of an acid, said metal salt being a member selected from the group consisting of halides, nitrates, sulfates and phosphates, the metal cation of the salt being a member selected from the group consisting of calcium, zinc, copper, silver and nickel, and said water comprising at least 5 percent by weight of said epoxy resin and amine hardener based on the weight of said composition;

(b) preparing an assembly of ceramic tile in speed edge-to-edge relationship;

(c) filling the spaces between the tile with adhesive grout composition; and (d) permitting the grout to harden.

References Cited by the Examiner

UNITED STATES PATENTS

| | | | |
|---|---|---|---|
| 2,773,048 | 12/1956 | Formo et al. | 260—47 |
| 2,819,233 | 1/1958 | Smith et al. | 260—47 |
| 2,958,609 | 11/1960 | Stoll et al. | 260—37 |
| 3,018,264 | 1/1962 | Colclough | 260—37 |
| 3,050,493 | 8/1962 | Wagner et al. | 260—29.2 |

JOSEPH L. SCHOFER, *Primary Examiner.*

JAMES A. SEIDLECK, *Examiner.*